(12) United States Patent
Knab et al.

(10) Patent No.: US 7,122,981 B2
(45) Date of Patent: Oct. 17, 2006

(54) METHOD FOR MONITORING THE REVERSING PROCESS OF ELECTRICALLY ACTUATABLE UNITS

(75) Inventors: Norbert Knab, Appenweier (DE); Patric Kahles, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 489 days.

(21) Appl. No.: 10/450,091

(22) PCT Filed: Aug. 6, 2002

(86) PCT No.: PCT/DE02/02880

§ 371 (c)(1),
(2), (4) Date: Jun. 10, 2003

(87) PCT Pub. No.: WO03/038968

PCT Pub. Date: May 8, 2003

(65) Prior Publication Data
US 2005/0097821 A1 May 12, 2005

(30) Foreign Application Priority Data
Oct. 17, 2001 (DE) ................. 101 51 184

(51) Int. Cl.
*H02P 3/00* (2006.01)
*H02P 3/20* (2006.01)
(52) U.S. Cl. .............. 318/283; 318/280; 318/469; 318/434; 49/26; 49/28
(58) Field of Classification Search ............ None
See application file for complete search history.

(56) References Cited

U.S. PATENT DOCUMENTS 5,396,158 A * 3/1995 Long et al. ............ 318/282
5,926,383 A * 7/1999 Pilukaitis et al. .......... 363/50
6,104,156 A    8/2000 Bruno
6,164,015 A * 12/2000 Kawanobe et al. ....... 318/282
6,215,265 B1 * 4/2001 Wolfer et al. ............ 318/434
6,795,284 B1 * 9/2004 Bruno ..................... 318/430
6,836,088 B1 * 12/2004 Hiwatari .................. 318/280
6,867,563 B1 * 3/2005 Ohshima .................. 318/434
6,940,246 B1 * 9/2005 Mochizuki et al. ....... 318/469
2003/0151382 A1 * 8/2003 Daniels et al. ............ 318/466
2003/0216817 A1 * 11/2003 Pudney ..................... 700/17
2004/0104701 A1 * 6/2004 Ohshima .................. 318/445
2005/0063036 A1 * 3/2005 Bechtel et al. ............ 700/19
2005/0092097 A1 * 5/2005 Shank et al. .............. 73/780

FOREIGN PATENT DOCUMENTS

| DE | 30 34 118 A1 | 3/1982 |
| DE | 198 09 628 A1 | 9/1999 |
| DE | 199 01 855 A1 | 7/2000 |

* cited by examiner

*Primary Examiner*—Lincoln Donovan
*Assistant Examiner*—Eduardo Colon Santana
(74) *Attorney, Agent, or Firm*—Michael J. Striker

(57) ABSTRACT

The invention relates to a method for monitoring and controlling reversing actions in electrically actuatable units, wherein an actuating drive unit can exert an actuating force in order to move an electrically actuatable unit, and a safety circuit automatically switches off the actuating drive unit after a jamming switch-off time that is predetermined for a movement if no movement occurs despite the triggering of the actuating drive unit. According to the invention, a triggered reversing action results in a temporary extension of the predetermined jamming switch-off time from a short jamming switch-off time $t_1$ that is predetermined for normal operation to a longer jamming switch-off time $t_2$ (2).

8 Claims, 3 Drawing Sheets

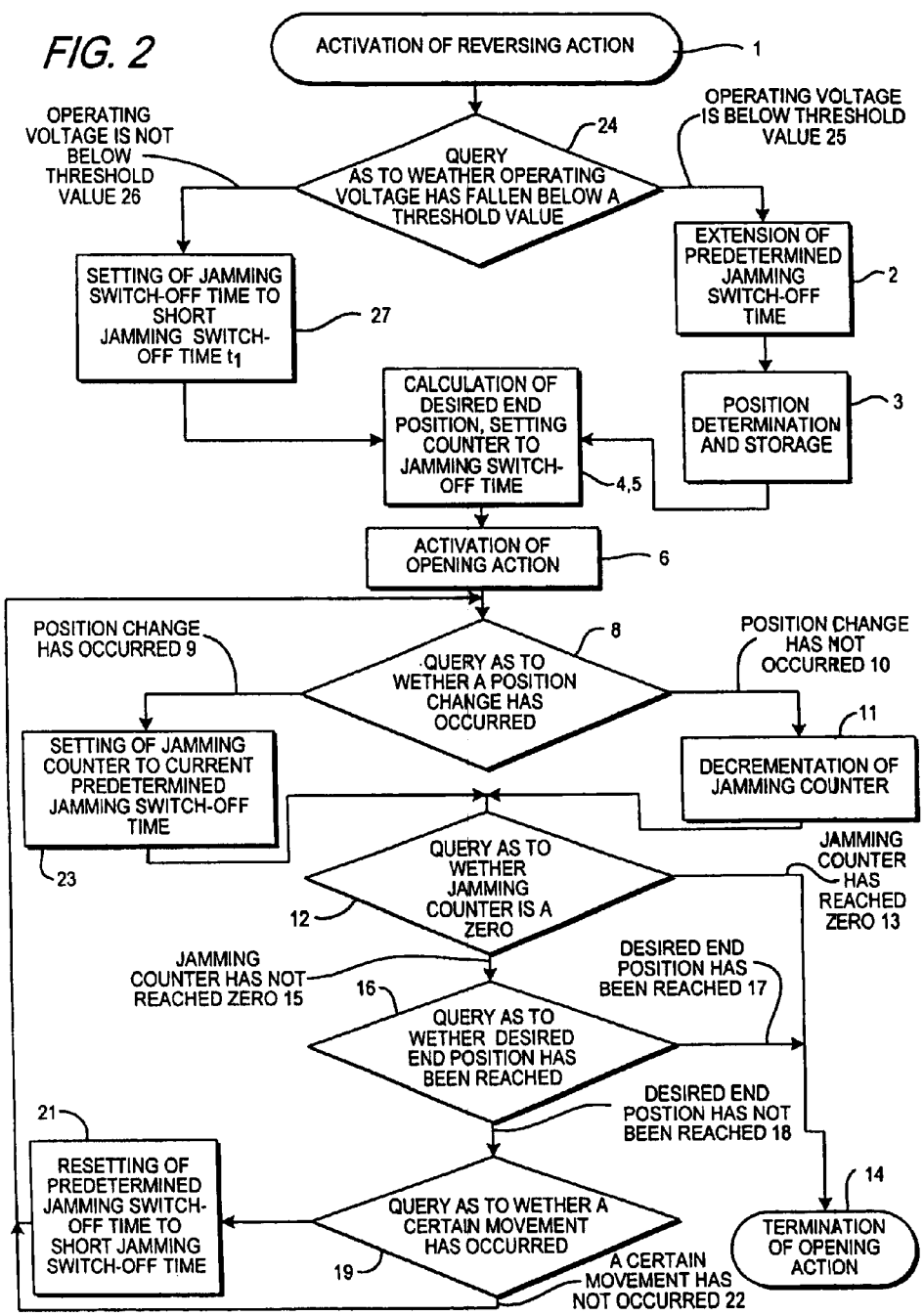

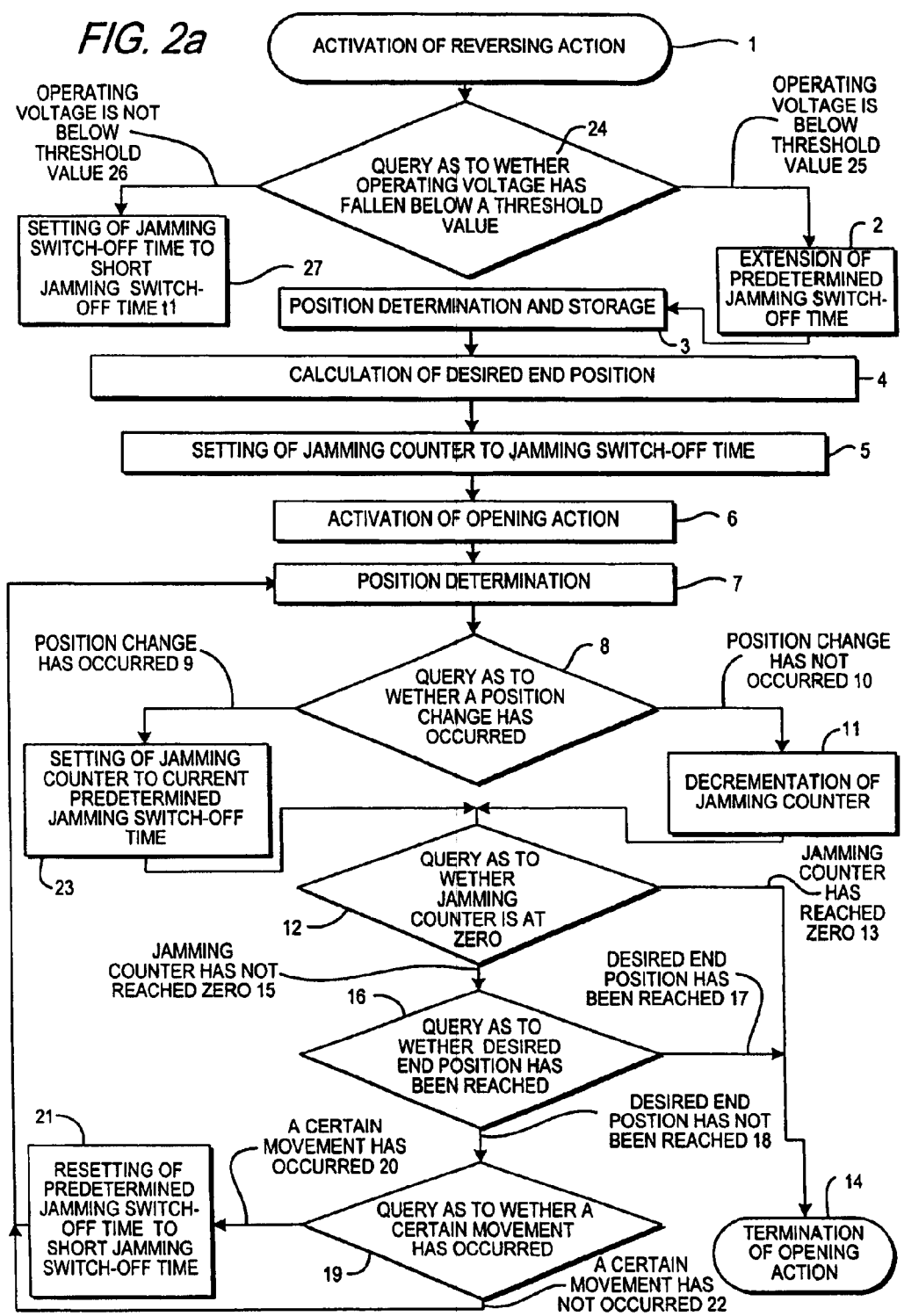

METHOD FOR MONITORING THE REVERSING PROCESS OF ELECTRICALLY ACTUATABLE UNITS

CROSS-REFERENCE TO A RELATED APPLIACTION

The invention described and claimed hereinbelow is also described in German Patent Application DE 101 51 184 1 filed on Oct. 17, 2001. This German Patent Application, whose subject matter is incorporated here by reference, provides the basis for a claim of priority of invention under 35 U.S.C. 119(a)–(d).

BACKGROUND OF THE INVENTION

Modern motor vehicles are equipped with comfort systems, for example power windows or sunroofs. These permit the windows and sunroof to be automatically opened and closed. The manual operation is controlled for example with the aid of rocker switches with three switch positions. One switch position activates the opening action, one activates the closing action, and another switches off the drive motor that generates the respective movement.

DE-A 198 09 628 relates to a drive unit for moving a component, for example a window, a seat, or a sunroof of a motor vehicle. The drive unit has an electric motor with for example three field coil pairs, which is brushless and can therefore be supplied by an electronic commutation circuit. A safety circuit switches the electric motor off for example if the moving component begins to pinch a human appendage. The safety circuit reacts to the frequency of signals obtained from current or voltage fluctuations in at least one electrical transmission line of the motor.

The subject of DE-A 199 01 855 is a method and device for operating an actuating drive unit in a motor vehicle. The method is comprised among other things of the fact that an actuating force exerted by the actuating drive unit is measured, this actuating force is compared to a limit force, and the actuating drive unit is reversed if the limit force is exceeded (closing force limitation).

DE-A 30 34 118 relates to a method for electronically actuating and monitoring the opening and closing cycle of electrically actuatable units, for example power windows and electric sunroofs, in particular of motor vehicles, as well as an electrical circuit arrangement for executing the method. An electrical actuating drive unit connected to the dc-powered electrical system can be actuated by means of electrical switches, in particular push buttons. In order to avoid safety defects (the pinching of at-risk appendages such as the neck, head, fingers, etc.), the path traveled is electronically detected during the opening of the unit, this detected opening path is compared to the closing path traveled during the closing of the unit, and the speed of the electric actuating drive unit during closing is detected and electronically compared to a constant standard value. When there is a reduction in speed during closing, the actuating drive unit is switched off. This is intended to reduce the safety defects such as the pinching of at-risk appendages during the closing of the electrically actuatable units.

In the prior art, the actuating drive unit is also switched off if one of the electrically actuatable units jams, in order to thus prevent a mechanical or electrical overload of the actuating drive unit. This switching off is triggered after a predetermined jamming switch-off time has elapsed in which the unit has been jammed in the opening or closing direction. Usually the jamming switch-off time is predetermined as a period of between 100 ms and 500 ms.

This jamming switch-off time, however, can be disadvantageous if a reversing of the actuating drive unit is triggered (for example due to a pinching emergency), but is not possible because of temporary voltage dips in the operating voltage. If the voltage dips last longer than the jamming switch-off time, then the evaluation electronics switch the drive unit off in the same way as when there is a jam. A pinched appendage is therefore no longer released.

Then a reversal from the closing action to the opening action of the actuating drive unit is not possible, for example, if the operating voltage (e.g. the electrical system voltage of a motor vehicle) temporarily drops below the relay pick-up voltage of the relay that is used to switch to the opening action. In this connection, the relay pick-up voltage is understood to be the value of the lowest voltage that causes a relay to switch. Among other things, this relay pick-up voltage depends on the additional wiring (for example a protective diode before the relay winding), the ambient temperature, the self-heating, and the internal resistance of the relay driver, and is typically between 8 and 10 V. The relay holding voltage required to hold the switched relay in the switch position, however, is lower than the relay pick-up voltage. A low operating voltage (electrical system voltage) can therefore be high enough to exceed the relay holding voltage and still be lower than the relay pick-up voltage. In this case, it is possible, for example, to hold the relay—which is for switching to the closing action—in the closed switch position, but it is not possible to reverse the actuating drive unit by switching the relay for the opening action since the voltage falls below the required relay pick-up voltage. As a result, the unit to be actuated does not move in the opening direction. A possible result then, as described above, is that the drive unit is switched off after the jamming switch-off time has elapsed.

SUMMARY OF THE INVENTION

The embodiment according to the invention has the advantage that it assures the automatic releasing of a pinched appendage even in the event of a temporary drop in operating voltage. This results in an improved safety behavior of electrically actuatable units at a low operating voltage. It is also advantageous that no additional sensors are required to execute the method according to the invention if position-measuring sensors for the units are already provided. In addition, the method according to the invention is used for indirect relay control with every reversal switching action of electrically actuatable units, not just when a pinching occurs. Electrically actuatable units are understood in particular to be power windows and sunroofs of motor vehicles and, for example, also electrically actuatable sliding doors, seats, convertible roofs, and hoods.

These advantages are attained according to the invention by means of a method for monitoring and controlling reversing actions in electrically actuatable units, in which an actuating drive unit can exert an actuating force in order to move an electrically actuatable unit, and a safety circuit automatically switches off the actuating drive unit after a jamming switch-off time predetermined for a movement has elapsed during which no movement has occurred despite the fact that the actuating drive unit is switched on. According to the invention, a triggered reversing action temporarily results in an extension of the predetermined jamming switch-off time from a short jamming switch-off time $t_1$ predetermined for normal operation to a longer jamming switch-off time $t_2$.

Reversing actions are understood to be actions in which a triggered action is reversed. For example, an opening action of a power window in a motor vehicle is interrupted and a closing action is activated or conversely a closing action is interrupted and an opening action is activated.

In motor vehicle power windows, actuating drive units can, for example, contain one of two different systems: a linkage having only turning and sliding pairs or a linkage with a Bowden cable. In the purely turning and sliding linkage, a drive motor (electric motor) sets a spur gear in motion in order to drive a toothed segment connected to the turning and sliding linkage. In the Bowden cable linkage, the drive motor drives a Bowden cable arrangement. In this connection, an actuating drive unit is understood to encompass a drive motor and a linkage.

The safety circuit automatically switches off the actuating drive unit when a jamming of the electrically actuatable unit is detected that lasts longer than a predetermined jamming switch-off time. A jamming is detected when the actuating drive unit is triggered, but no position change of the electrically actuatable unit is detected. For example, a jamming is detected if a control element (e.g. a rocker switch) indicates to the control electronics the desired operating mode, for example the closing of an electric sunroof in a motor vehicle, and then no position change of the sunroof in the closing direction is detected within a jamming switch-off time (e.g. 500 ms). The triggering of the actuating drive unit in this connection can occur not only manually by means of a control element, but also by means of control electronics, for example in a closing force limitation, in which a reversal of the actuating drive unit is triggered as soon as a threshold value of the closing force is exceeded.

According to the invention, when a reversing action is triggered, a temporary extension of the predetermined jamming switch-off time from a short jamming switch-off time $t_1$ predetermined for normal operation to a longer jamming switch-off time $t_2$ takes place. The short jamming switch-off time $t_1$ is predetermined for normal operation in order to prevent a mechanical or electrical overload of the actuating drive unit in the event of a jam. However, it has the disadvantage that when there are short voltage drops that prevent a triggering of the actuating drive unit (for example because the voltage falls below a relay pick-up voltage), a jamming is ascertained and the safety circuit switches off the actuating drive unit. This is particularly dangerous in reversing actions because they may be triggered due to an emergency (the pinching of an appendage). In such an emergency, if no movement in the reverse direction occurs within the short jamming switch-off time (because the operating voltage is temporarily too low), then the actuating drive unit is switched off. There is thus a greater risk of injury for the person whose appendage has gotten pinched since he is no longer even released in a more delayed fashion once the operating voltage returns to a sufficient level. The predetermining of a longer jamming switch-off time $t_2$ during the initiation of a reversing action solves this problem since now, a temporary jamming of the actuating drive unit no longer results in a final switching-off of the actuating drive unit. Temporary jams for example due to short drops in the operating voltage, are bridged over by a longer jamming switch-off time $t_2$.

If the short jamming switch-off time $t_1$ in power windows of motor vehicles, for example, lies between 100 ms and 500 ms, then a value between 10 s and 50 s, for example, could be predetermined for the longer jamming switch-off time $t_2$.

The extension of the jamming switch-off time from $t_1$ to $t_2$, however, must only be temporary since otherwise an overloading of the actuating drive unit can therefore occur, for example at the actual mechanical stop of the electrically actuatable unit.

BRIEF DESCRIPTION OF THE DRAWINGS

The invention will be explained in detail below in conjunction with the drawings.

FIG. 2 is a flowchart that depicts the course of a method according to the invention, in which the jamming switch-off time is temporarily extended only when a reversing action is initiated and the operating voltage falls below a threshold value, and FIG. 2a is a flowchart that depicts the course of another method according to the invention, in which the jamming switch-off time is temporarily extended only when a reversing action is initiated and the operating voltage falls below a threshold value.

DESCRIPTION OF THE PREFERRED EMBODIMENTS

Figure 1:
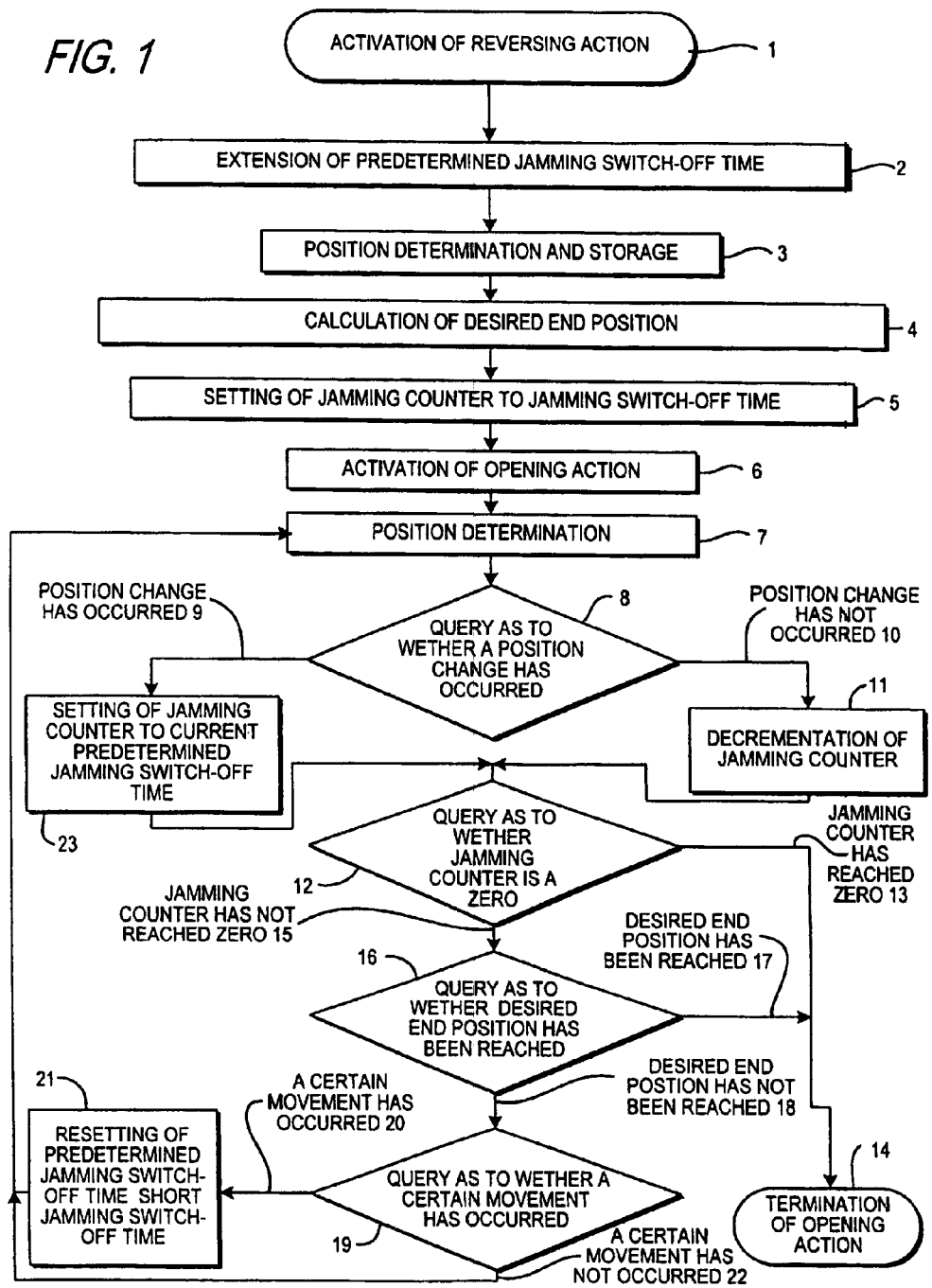
FIG. 1 is a flowchart that depicts the course of a method according to the invention, in which the jamming switch-off time is temporarily extended with each reversing action.

The flowchart in FIG. 1 represents an embodiment variant of the method according to the invention, in which the jamming switch-off time is temporarily extended with each reversing action.

In the preferred embodiment of the current invention that is shown, the reversing action corresponds to a reversal from a closing action into an opening action.

The aim of activating the reversing action 1 can, for example, be to trigger an opening action in order to release an appendage that has been pinched during the closing action. The activation of the reversing action 1 results in an extension of the predetermined jamming switch-off time 2 from $t_1$ to $t_2$. Then the current position 3 of the electrically actuatable unit is determined and stored, a desired position is calculated 4, and a jamming counter is set to the predetermined jamming switch-off time 5.

In a preferred embodiment of the current invention, at least one position sensor detects the current position of the electrically actuatable unit. The position determination 3 can, for example, be executed by means of incremental sensors, e.g. by means of Hall sensors. In this connection, it is advantageous to use the position sensors that are already present so that no additional costs are incurred in order to carry out the method according to the invention.

In this preferred embodiment of the current invention depicted in FIG. 1, the current position of the electrically actuatable unit detected by the position sensor is stored as a reversing position when the reversing action 1 is triggered. In the rest of the method according to the invention, this stored reversing position is used as a comparison value in order to determine whether a defined position change has occurred since the activation of the reversing action 1.

The calculation of the desired end position 4 should determine the position of the electrically actuatable unit that should have been reached since the actuating drive unit activated the reversing action 1. The desired end position can, for example, be the position of the electrically actuatable unit in which it is completely open or in which the release of a pinched appendage would be reliably assured.

In a preferred embodiment of the current invention, the predetermined jamming switch-off time is counted down on a jamming counter. In the method according to the invention depicted in FIG. 1, the jamming counter is set to the longer jamming switch-off time $t_2$ after the activation of the reversing action 1. The jamming counter is decremented by defined time units during the course of the method according to the invention. When the jamming counter reaches zero, the predetermined jamming switch-off time has elapsed.

The next step in the method according to the invention is the activation of the opening action 6. The activation occurs, for example, through the switching of at least one relay. The actuating drive unit should thus be triggered so that it exerts an actuating force in order to move the electrically actuatable unit in the opening direction.

Then the at least one position sensor determines the current position 7 of the electrically actuatable unit once more. This position determination 7 after the activation of the opening action 6 serves as a basis for the query as to whether a position change has occurred 8. An affirmative response to this query 8 (position change has occurred 9) is produced if the current position (in the opening direction) determined in the position determination 7 differs from the reversing position that was determined and stored in position determination 3. A negative response (position change has not occurred 10) is produced if both of the position determinations 3, 7 have yielded the same position.

If the response to query 8 is negative (position change has not occurred 10), then the electrically actuatable unit could be jammed. The jamming counter is therefore decremented 11, i.e. reduced by a defined time unit. If the response to query 8 is affirmative (position change has occurred 9), then the jamming counter is set to the currently predetermined jamming switch-off time (23). Then a query is executed as to whether the jamming counter is at zero 12. This would mean that the jamming switch-off time had elapsed. If the response is affirmative (jamming counter has reached zero 13), then the actuating drive unit is switched off (by a safety circuit) and the opening action 14 is thus terminated. In particular, this serves to protect the actuating drive unit from overloading. If the response to query 12 is negative (jamming counter has not reach zero 15), then a further query 16 is executed as to whether the electrically actuatable unit has reached the desired end position calculated in step 4. This query 16 receives an affirmative response (desired end position has been reached 17) if the current position determined in step 7 corresponds to the desired end position calculated in step 4. Then the electrically actuatable unit has reached the desired position and the opening action 14 is terminated (switching off of the actuating drive unit). A negative response to the query 16 (desired end position has not been reached 18) means that further movement of the electrically actuatable unit is required in order to reach the desired end position. As a result, the method according to the invention continues with a further query 19.

In a preferred embodiment of the current invention, if the position sensor has detected a movement from the reversal position in the direction sought by the reversing action within the predetermined jamming switch-off time $t_1$ or $t_2$, then the predetermined jamming switch-off time is set to the short jamming switch-off time $t_1$.

In a particularly preferred embodiment of the current invention, the predetermined jamming switch-off time is set to the short jamming switch-off time $t_1$ if the movement in the direction sought by the reversing action that the position sensor detects within the predetermined jamming switch-off time $t_1$ or $t_2$ is equal to or greater than a defined desired movement $\Delta X$.

These two embodiment forms of the current invention can be achieved through the query 19 and the subsequent action 20 in the method according to the invention depicted in FIG. 1. In query 19, a determination is made as to whether a certain movement has occurred. In the case of the first preferred embodiment of the current invention explained above, this would mean that the comparison of the current position determined in process step 7 to the reversal position determined in step 3 determines that a movement in the opening direction has occurred. In the case of the particularly preferred embodiment of the current invention explained above, a certain movement is detected if the difference between the current position and the reversal position reaches or exceeds a defined desired movement $\Delta X$.

If the query 19 as to whether a certain movement has occurred receives an affirmative response 20, then the predetermined jamming switch-off time is reset to the short jamming switch-off time $t_1$ 21. If the query 19 as to whether a certain movement has occurred receives a negative response 22, then the jamming switch-off time remains unchanged.

After the jamming switch-off time is reset 21 (when the response is affirmative 20) or left the same (when the response is negative 22), the position determination in step 7 is repeated. This produces a loop that is repeated until the last process step 14, the termination of the opening action (switching off of the actuating drive unit).

In the event of an emergency due to the pinching of an appendage, the method according to the invention depicted in FIG. 1 proceeds as follows:

The pinching of an appendage during the closing of the electrically actuatable unit triggers the initiation of a reversing action 1. This can occur, for example, through manual actuation of a control element or automatically through closing force limitation. As a result, the jamming switch-off time is extended to $t_2$ 2, the current position of the electrically actuatable unit is determined and stored as a reversal position 3, the desired return position is calculated 4, the jamming counter is set to the jamming switch-off time $t_2$ 5, and the opening action is activated 6. Then the current position of the electrically actuatable unit is determined again 7, which is required in the query 8 as to whether a position change has occurred. If the electrically actuatable unit has not moved since the activation of the opening action 6, for example due to a temporary drop in operating voltage that prevents a switching of the relay required for the opening action, then the jamming counter 11 is decremented. The query 12 as to whether the jamming counter is at zero receives the response "no" after the first decrementation so that the method according to the invention continues with the query 16 as to whether the desired position has been reached. This query 16, like the subsequent query 19, as to whether a certain movement has occurred will receive a negative response in this instance so that a position determination 7 is now executed once again.

If query 8 receives an affirmative response 9 in a passage through this loop, for example because the operating voltage has increased once more, then the jamming counter is set to the currently predetermined jamming switch-off time 23. If the position change produced has reached the desired position calculated in step 4, then the opening action is terminated 14 after query 16 and the passage through the loop is therefore interrupted. The pinched appendage is released. If the desired position has not yet been reached, then the query 19 is executed. If a certain movement 20 has occurred, for example if the position change is greater than a defined desired movement that should assure the release of a pinched appendage, then the jamming switch-off time is reset back to the shorter one $t_1$ 21. In step 23, the jamming counter assumes the short jamming switch-off time. This has the advantage that in the event of a possibly ensuing actual jamming of the electrically actuatable unit or even of the actuating drive unit, the actuating drive unit is then switched off again after the short jamming switch-off time so that no overload can occur.

In the event of a longer-lasting jamming of the electrically actuatable unit, the method according to the invention depicted in FIG. 1 is interrupted 14 after multiple passes through the loop after query 12 since the jamming counter has then reached zero 13.

FIGS. 2 and 2a each depict a flowchart of a method according to the invention, in which the jamming switch-off time is temporarily extended only when a reversing action is being initiated and the operating voltage falls below a threshold value.

In one embodiment of the current invention, the predetermined jamming switch-off time is extended from a short jamming switch-off time $t_1$ predetermined for normal operation to a longer jamming switch-off time $t_2$ if an operating voltage that is required to trigger the reversing action falls below a predetermined threshold value.

In a preferred embodiment of the current invention, the predetermined jamming switch-off time is extended from a short jamming switch-off time $t_1$ predetermined for normal operation to a longer jamming switch-off time $t_2$ only if an operating voltage for switching the actuating drive unit with the aid of at least one relay lies in a range close to the relay pick-up voltage of the at least one relay.

In a particularly preferred embodiment of the current invention, the predetermined jamming switch-off time is extended from a short jamming switch-off time $t_1$ that is predetermined in a normal case to a longer jamming switch-off time $t_2$ only if an operating voltage for switching the actuating drive unit with the aid of at least one relay is less than the relay pick-up voltage.

FIG. 2 shows the course of a method according to the invention in one of these three embodiment forms. After the activation of the reversing action 1, a query 24 is executed as to whether the operating voltage has fallen below a defined threshold value. This threshold value can, for example, be the relay pick-up voltage, which is the minimum voltage required to switch the relay for the opening action. But the threshold value can also be greater than the relay pick-up voltage when the operating voltage is low so that even in the range below the low operating voltage, the query 24 receives an affirmative response 25 (that the operating voltage lies below the threshold value). An affirmative response 25 results in an extension 2 of the jamming switch-off time to $t_2$ and a determination and storage 3 of the reversal position. A negative response 26 (operating voltage is not below the threshold value) results in the fact that the jamming switch-off time is set to the short jamming switch-off time $t_1$ 27.

Then the method according to the invention continues with the calculation of the desired position 4, the setting of the jamming counter 5, etc. (as described above in conjunction with FIG. 1).

FIG. 2a shows the course of another method according to the invention in one of the three embodiment forms mentioned above. After the activation of the reversing action 1, a query 24 is also executed as to whether the operating voltage has fallen below a defined threshold value. An affirmative response 25 results in an extension 2 of the jamming switch-off time to $t_2$. A negative response 26 (operating voltage is not below the threshold value) results in the fact that the jamming switch-off time is set to the short jamming switch-off time $t_1$ 27. The method according to the invention is then continued with the position determination and storage 3, the calculation of the desired position 4, etc. (as described above in conjunction with FIG. 1).

The method according to the invention depicted in FIG. 2 differs from the method according to the invention depicted in FIG. 2a in that the position determination and storage 3 is not executed in every instance, but only in the event that the query 24 receives an affirmative response 25. The query 19 as to whether a certain movement has occurred must therefore be masked out if query 24 has received a negative response 26 and consequently, step 3 has not been executed since a reversal position stored in step 3 is required in order to make a decision regarding this query 19. If the query 19 is masked out, after a negative response 18 to the query 16, the method according to the invention automatically continues with query 8. In the method according to FIG. 2a, the determination and storage of the reversal position 3 as well as the query 19 as to the certain movement are executed in every instance. The position determination 7 can be executed both as part of the method according to the invention (FIG. 2a) and in a separate function (modularization principle) (FIG. 2, not shown).

The preferred embodiments of the current invention depicted in FIGS. 2 and 2a represent among other things a universal control as to whether reversing actions are functioning properly. Even with a sufficiently high operating voltage at which there is no extension of the jamming switch-off time, the method is executed until one of the two switch-off criteria 12 (jamming counter at zero) or 16 (desired position reached) has been fulfilled.

In a preferred embodiment of the current invention, the method according to the invention is interrupted in the vicinity of mechanical stops of the electrically actuatable unit. Power windows in motor vehicles, for example, strike against a stop when they are completely opened and strike against another stop when they are completely closed. Shortly before one of these two stops is reached, it is advantageous to interrupt the method according to the invention since the actuating drive unit of the window would otherwise run the risk of being overloaded due to the extended jamming switch-off time. In this case, an interruption of the method according to the invention is insignificant with regard to the danger of pinching. When a motor vehicle window is almost completely open, there is never any danger of pinching during a movement in the opening direction. In a closing window that is almost completely closed, the position at which the method according to the invention is interrupted should be selected so that the distance to the stop is too small to pinch an appendage.

REFERENCE NUMERAL LIST

1 activation of the reversing action
2 extension of the predetermined jamming switch-off time
3 position determination and storage
4 calculation of the desired end position
5 setting of the jamming counter to the jamming switch-off time
6 activation of the opening action
7 position determination
8 query as to whether a position change has occurred 9 position change has occurred
10 position change has not occurred
11 decrementation of the jamming counter
12 query as to whether the jamming counter is at zero
13 jamming counter has reached zero
14 termination of the opening action
15 jamming counter has not reached zero
16 query as to whether the desired end position has been reached
17 desired end position has been reached
18 desired end position has not been reached
19 query as to whether a certain movement has occurred
20 a certain movement has occurred
21 resetting of the predetermined jamming switch-off time to the short jamming switch-off time
22 a certain movement has not occurred
23 setting of the jamming counter to the current predetermined jamming switch-off time
24 query as to whether the operating voltage has fallen below a threshold value
25 operating voltage is below the threshold value
26 operating voltage is not below the threshold value
27 setting of the jamming switch-off time to the short jamming switch-off time $t_1$

The invention claimed is:

1. A method for monitoring and controlling reversing actions in electrically actuatable units, comprising the steps of exerting an actuating force by an actuating drive unit in order to move an electrically actuatable unit; automatically switching off the actuating drive unit by a safety circuit after a jamming switch-off time that is predetermined for a movement has elapsed if no movement occurs despite triggering of the actuating drive unit; providing a triggered reversing action resulting in a temporary extension of the predetermined jamming switch-off time from a short jamming switch-off time that is predetermined in a normal case to a longer switch-off time; detecting a current position of the electrically actuatable unit by at least one position sensor; and storing the current position of the electrically actuatable unit detected by the position sensor as a reversal position for use as a comparison value in order to determine whether a define position change has occurred since an activation of the reversing action.

2. A method as defined in claim 1; and further comprising extending the predetermined jamming switch-off time from the short jamming switch-off time that is predetermined in a normal case to the longer jamming switch-off time only if an operating voltage required for triggering the reversing action falls below a predetermined threshold value.

3. A method as defined in claim 1; and further comprising extending the predetermined jamming switch-off time from the short jamming switch-off time that is predetermined in a borderline case to the longer jamming switch-off time only if an operating voltage for switching the actuating drive unit with at least one relay lies in a range close to a relay pick-up voltage of the at least one relay.

4. A method as defined in claim 1; and further comprising extending the predetermined jamming switch-off time from the short jamming switch off time that is predetermined for normal operation to the longer jamming switch-off time only if an operating voltage for switching the actuating drive unit with at least one relay is less than a relay pick-up voltage.

5. A method as defined in claim 1; and further comprising selecting the reversing action so that it corresponds to a reversal from a closing action into an opening action.

6. A method as defined in claim 1; and further comprising counting down the predetermined jamming switch-off time on a jamming counter.

7. A method as defined in claim 1; and further comprising setting the predetermined jamming switch-off time to the short jamming switch-off time ir within the predetermined short jamming switch-off time that is predetermined in a normal operation or the longer jamming switch-off time the position sensor detects a movement from a reversal position in a direction sought by a reversing action.

8. A method as defined in claim 7; and further comprising setting the predetermined jamming switch-off time to the short jamming switch-off time if the movement in the direction sought by the reversing action that the position sensor detects within the predetermined short jamming switch-off time that is predetermined in a normal operation or the longer jamming switch-off time is equal to or greater than a defined desired movement.

* * * * *